(12) United States Patent
Lynch et al.

(10) Patent No.: US 6,300,894 B1
(45) Date of Patent: Oct. 9, 2001

(54) ANTENNA HAVING ELECTRICALLY CONTROLLABLE RADAR CROSS-SECTION

(75) Inventors: Michael J. Lynch, Merritt Island; Charles M. Newton, Palm Bay, both of FL (US); George M. Walley, San Jose, CA (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/350,482

(22) Filed: Jul. 9, 1999

(51) Int. Cl.[7] .................................................. G01S 7/38
(52) U.S. Cl. .................... 342/13; 342/1; 342/2; 342/3; 342/4; 342/5; 342/6
(58) Field of Search ................... 342/1, 2, 3, 4, 342/5, 6, 7, 11, 13

(56) References Cited

U.S. PATENT DOCUMENTS

| | | | |
|---|---|---|---|
| 3,958,246 | * 5/1976 | Wohlers et al. | 343/754 |
| 4,090,198 | * 5/1978 | Canty et al. | 342/11 |
| 4,117,485 | * 9/1978 | Gorr et al. | 342/6 |
| 4,134,008 | * 1/1979 | de Corlieu et al. | 342/45 X |
| 4,347,512 | 8/1982 | Sweeney | 343/6.5 |
| 4,987,418 | 1/1991 | Kosowsky et al. | 342/6 |
| 5,548,289 | 8/1996 | Chekroun et al. | 342/16 |
| 5,583,507 | 12/1996 | D'Isepo et al. | 342/45 |
| 5,594,456 | 1/1997 | Norris et al. | 343/701 |
| 5,600,325 | * 2/1997 | Whelan et al. | 342/13 |
| 5,648,787 | 7/1997 | Ogot et al. | 343/826 |
| 5,670,959 | 9/1997 | Nagura et al. | 342/6 |
| 5,680,136 | * 10/1997 | Chekroun | 342/6 |
| 5,819,164 | * 10/1998 | Sun et al. | 455/106 |
| 6,184,815 | * 2/2001 | Carlson | 342/4 |

* cited by examiner

*Primary Examiner*—John B. Sotomayor
(74) *Attorney, Agent, or Firm*—Allen, Dyer, Doppelt, Milbrath & Gilchrist, P.A.

(57) ABSTRACT

An RF interface is configured as a laminate structure having a core layer of a ferromagnetic ceramic material, such as barium strontium titanate, whose permitivity is electrically controllable to modify the behavior of impinging electromagnetic energy, as one of minimally attenuated transmission, maximally attenuated absorption, and highly unattenuated reflection. Opposite surfaces of the ceramic core are coated with an electrically lossy material, such as indium tin oxide, to which a differential DC voltage is applied, and thereby imparting a DC electric field to the core layer. For an antenna application, during transmit/receive mode, the differential voltage has a magnitude that renders the laminate's core highly conductive, and thereby reflective to the RF wavelength being sourced from or received by an associated feed horn. During other times, the differential voltage renders the laminate effectively transparent to RF wavelengths in a prescribed band of interest (e.g., a search radar emanating from a threat platform, such as an aircraft).

10 Claims, 3 Drawing Sheets

ANTENNA HAVING ELECTRICALLY
CONTROLLABLE RADAR CROSS-SECTION

FIELD OF THE INVENTION

The present invention relates in general to communication systems, and is particularly directed to a new and improved RF interface structure having a radar cross-section that is electrically controllable, so as to enable an antenna or radome's reflectivity characteristic or 'signature' to RF energy to be controllably modified at times other than when the structure is being used in conjunction with the transmission or reception of electromagnetic energy (e.g., receive or transmit communication signals).

BACKGROUND OF THE INVENTION

The survivability of RF transmit/receive systems that are deployable in a hostile environment depends upon their ability to avoid detection by a threat radar. For this purpose, the deployed system preferably employs a configuration and uses 'stealth' materials that will minimize its radar cross-section (RCS). On the other hand, because the inherent functionality of a transmit/receive system involves either or both the transmission and reception of RF energy, its operability requires that it exhibit, during some prescribed transmit/receive window, the very characteristic that makes it vulnerable to a threat—i.e., that it reflect electromagnetic energy.

SUMMARY OF THE INVENTION

In accordance with the present invention, this dual objective is effectively accomplished by means of a new and improved electromagnetic energy laminate structure, that may be employed in a variety of electromagnetic energy interface applications, such as, but not limited to use as an antenna reflector, as a radome structure, or the ground plane for an array. As will be described, A DC electric field is applied to the laminate in such a manner as to enable the structure's reflectivity characteristic or electromagnetic energy 'signature' to be controllably modified at times other than when it is being used in associated with the transmission or reception of RF energy (e.g., transmit and receive communication signals, radar signals and the like).

For this purpose, the RF interface of the present invention is preferably configured as a relatively compact laminate structure having a core layer of a material having at least one electrical property, such as permitivity, that is electrically controllable in such a manner as to produce a specified modification of the behavior of impinging electromagnetic energy. The specified behavior modification is one of minimally attenuated transmission, maximally attenuated absorption, and highly attenuated or unattenuated reflection.

The core layer preferably comprises a relatively thin (e.g. one-eighth to one-quarter inch) layer of a ferroelectric ceramic material, such as barium strontium titanate (BST). Opposite surfaces of the BST core are coated with microthin layers of an electrically conductive material, such as indium tin oxide, that is effectively transparent to electromagnetic energy of the frequency range of interest, such as UHF and SHF frequency bands RF or microwave frequencies typical employed in communication systems or radar systems (e.g., on the order of from 300 MHz to 30 GHz). A differential DC voltage is applied to the thin coatings on the BST core layer, so as to impart a prescribed DC electric field thereacross in accordance with the application in which the laminate structure is employed.

An alternative embodiment of the laminate architecture of the invention has multiple layers of ferromagnetic core material laminated on either side of an intermediate reflective layer and coated on their outer surfaces with thin coating layers. Each of the intermediate and outer surface coating layers may comprise a layer of indium tin oxide. A first potential, such as a ground voltage is applied to the intermediate reflective layer, while the outer thin coating layers are coupled to receive control voltages. As in the single core layer embodiment, the differential voltages and the resulting electric fields applied to the BST layers are selectively defined in accordance with the mode of operation of the multi-laminate structure.

For an application such as a reflector antenna or an array ground plane application, during transmit/receive mode, the magnitude of the differential voltage is set at a value that is effective to render the laminate's ferromagnetic ceramic core highly conductive, and thereby reflective to the RF wavelength being sourced from or received by an associated feed horn, or the array elements. During other times (quiescent mode), the magnitude of the differential voltage is set at a value that is effective render the laminate effectively transparent to RF wavelengths in a broad range of frequencies typical of search radars (e.g., at or below K-band and up to or slightly above K-band (27 GHz)).

When employed in a radome application, during transmit/receive mode of an RF communication system housed within the radome, the laminate's differential voltage is set at a value that renders the radome laminate effectively transparent to a broad band of RF wavelengths. During all other times (quiescent mode), the magnitude of the differential voltage is set at a value that is effective to render the radome laminate effectively absorbent of RF wavelengths, including those lying in a 'threat' band of interest, thereby minimizing the radar cross-section of the radome and its interior system components to a search/threat radar. Alternatively, when not in use, the structure may be controllably rendered reflective so as to direct impinging electromagnetic energy away from the transmit source.

DETAILED DESCRIPTION

Figure 1:
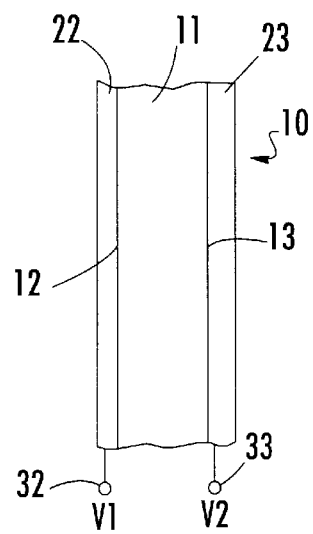
FIG. 1 is a diagrammatic cross-sectional view of an RF interface structure in accordance with the present invention.
Figure 2:
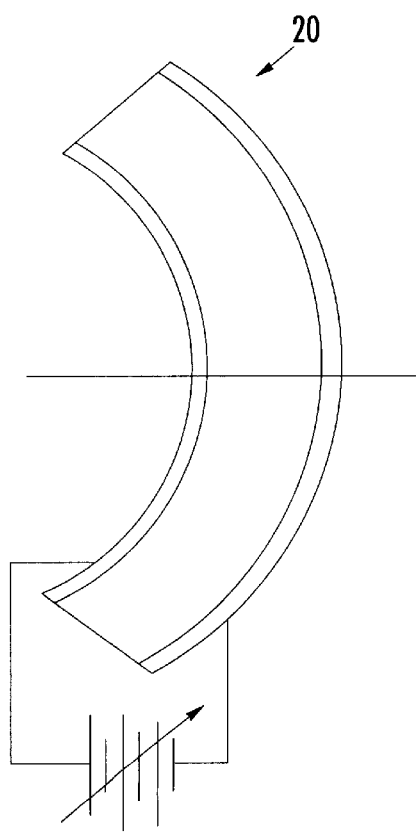
FIG. 2 shows the application of the invention to an antenna reflector.
Figure 3:
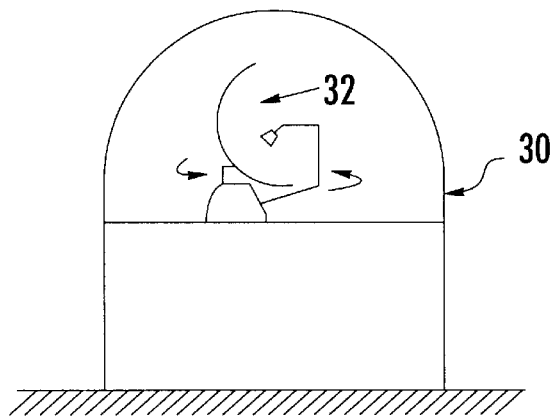
FIG. 3 shows the application of the invention to a radome structure.

FIG. 1 is a diagrammatic cross-sectional view of the RF interface structure of the present invention that may be employed in a variety of electromagnetic energy interface applications, such as, but not limited to use as an antenna reflector shown at 20 in FIG. 2, or as a radome structure shown at 30 in FIG. 3. As described briefly above, and as illustrated in FIG. 1, the RF interface structure of the invention is configured as a relatively compact laminate 10 having a central or core layer 11 that contains a material at least one electrical property (e.g., permitivity ($\epsilon$)) of which is electrically controllable so as to produce a specified modification of the behavior of impinging electromagnetic energy. The specified behavior modification may be one of minimally attenuated transmission, maximally attenuated absorption, and highly unattenuated reflection.

For this purpose, the core layer 11 preferably comprises a prescribed thickness (e.g. one-eighth to one-quarter inch) of a ferroelectric ceramic material, such as barium strontium titanate (BST), opposite surfaces 12 and 13 of which are respectively coated with very thin (e.g., several microns) layers 22 and 23 of a material that allows a permitivity-controlling DC electric field to be impressed across ferromagnetic material 11. A non-limiting, but preferred example of such a coating material is indium tin oxide ($InSnO_2$), which is commonly employed as a coating for liquid crystal substrates in liquid crystal display (LCD) devices. As pointed out above, this coating is essentially transparent to energy of the frequency range of interest (such as UHF and SHF frequency bands RF or microwave frequencies typical employed in communication systems or radar systems (e.g., on the order of 300 MHz to 30 GHz)).

Figure 4:
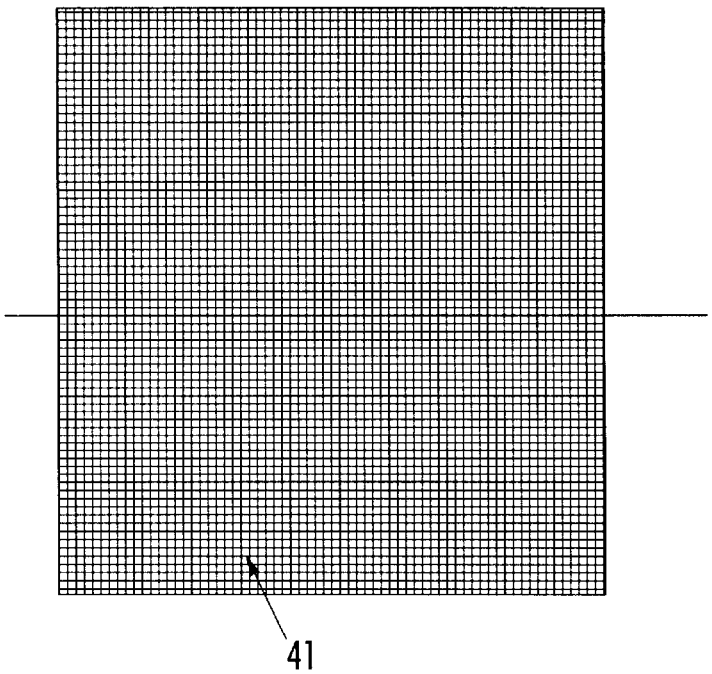
FIG. 4 shows an antenna reflector comprised of a plurality of sub-panels or tiles.

The layers 22 and 23 may be coated on the respective surfaces 12 and 13 of core layer 11 by conventional application techniques such as sputtering, spraying and the like. For large surface applications, such as a multimeter diameter parabolic reflector, or a large radome structure, the laminate structure of the invention may be configured as sub-panels or tiles as shown at 41 in FIG. 4. Each layer 22/23 is ohmic-connected to a respective electrical terminal 32/33, that is coupled to a respectively different DC voltage, so that a differential DC voltage (V1–V2) is applied to layers 22 and 23, thereby impressing a prescribed DC electric field across the intermediate BST core layer 11.

The differential voltage and the resulting DC electric field applied to the BST core layer 11 is selectively defined in accordance with the mode of operation of the application in which the laminate structure 10 of FIG. 1 is employed. When used in the antenna 20 of FIG. 2, the magnitude of the differential voltage may be defined to make the antenna either reflective or transparent. During transmit/receive mode, the magnitude of the differential voltage is set at a value that is effective to modify the permitivity of the ferromagnetic ceramic core 11 such that the laminate 10 is highly electrically conductive, and thereby reflective to the RF wavelength being sourced from or received by an associated feed horn (not shown).

During the time other than when transmitting or receiving (quiescent mode), the magnitude of the differential voltage is set at a value that is effective to modify the permitivity of the ferromagnetic ceramic core 11 such that the laminate 10 is rendered effectively transparent to RF wavelengths in the prescribed band of interest (e.g., a search radar emanating from a threat platform, such as an aircraft).

When employed in the radome structure 30 in FIG. 3, during transmit/receive mode of an RF communication system (e.g. radar) 32 housed within the radome 30, the magnitude of the differential voltage is set at a value that is effective to establish a value of the permitivity of the ferromagnetic ceramic core 11 of the radome's laminate 10 so that the laminate 10 is rendered effectively transparent to RF wavelengths being transmitted or received by the radome's housed system 32. During quiescent mode, the value of the differential voltage sets the permitivity of the ferromagnetic ceramic core 11 such that the laminate is rendered effectively lossy or absorbent of RF wavelengths in the band of interest, thereby minimizing the radar cross-section of the radome and its interior system components to a search/threat radar.

Figure 5:
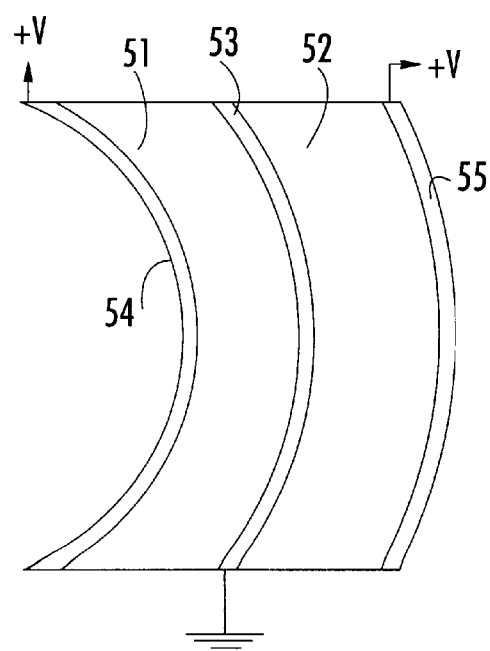
FIG. 5 is a diagrammatic cross-sectional view of a multi-laminate RF interface structure in accordance with the present invention.

An alternative embodiment of the laminate architecture of FIGS. 1 and 2, that employs the RF transmission and reflection control properties of the present invention, is diagrammatically illustrated in FIG. 5. In this embodiment, multiple layers 51 and 52 of ferromagnetic core material (e.g., barium strontium titanate (BST) are laminated on either side of an intermediate reflective layer 53, and coated on their outer surfaces with thin coating layers 54 and 55, respectively. Each of the layers 53, 54 and 55 may comprise a layer of indium tin oxide. A first potential, such as a ground (GND) voltage is applied to the intermediate reflective layer 53, while the outer thin coating layers 54 and 55 are coupled to receive a control voltage (+V). As in the above embodiment, the differential voltage (+V–GND) and the resulting DC electric fields applied to the BST core layers 51 and 52 is selectively defined in accordance with the mode of operation of the multi-laminate structure of FIG. 5.

Figure 6:
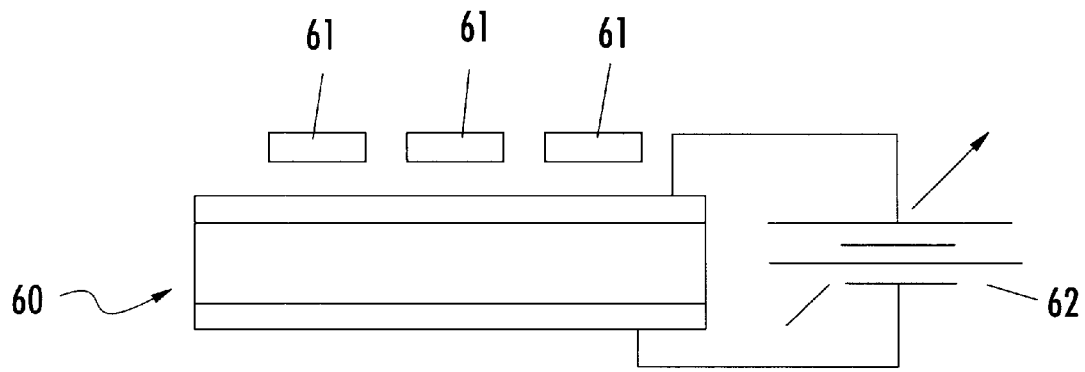
FIG. 6 is a diagrammatic side view of an array antenna having a ground plane configured using the present invention for a microstrip application.
Figure 7:
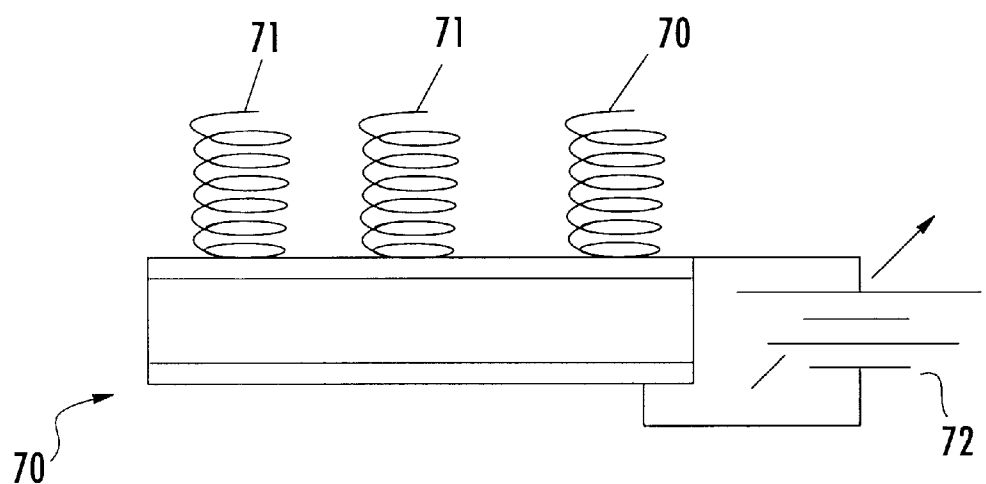
FIG. 7 is a diagrammatic side view of an array antenna having a ground plane configured using the present invention for a multi-helical element application.

As described above, the invention may employed for an array ground plane application, such as those shown diagrammatically in FIGS. 6 and 7, as non-limiting examples. In particular, FIG. 6 is a diagrammatic side view of an array antenna for a microstrip application, having a plurality of antenna elements 61 disposed adjacent to a ground plane structure 60 configured of the laminate interface structure of the present invention. FIG. 7 is a diagrammatic side view of an array antenna having a ground plane configured of the laminate structure of the present invention for a multi-antenna element application, shown as helical antenna elements 71 coupled to the controlled ground interface structure 70.

In this ground plane application, for transmit/receive mode, the magnitude of the differential voltage 62, 72 for the ground plane structure is set at a value that is effective to render the laminate's ferromagnetic ceramic core highly conductive. During other times (quiescent mode), the magnitude of the differential voltage is set at a value that is effective render the laminate ground plane structure effectively non-conductive.

As will be appreciated from the non-limiting application examples of the laminate antenna structure of the invention, a particularly useful feature is its ability to selectively or switchably limit the 'threat-exposure' duration of an RF energy reflective structure to only that period of time in which the functionality of the associated transmit/receive system is required (transmitting or receiving RF energy). During all other times, the permitivity-controlled laminate is placed in its appropriate 'stealth' condition (e.g., transparent for a reflector, absorbent or reflective for a radome), so as to minimize either its own radar cross-section or that of an associated protected subsystem.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. An RF energy interface comprising a laminate structure of a core layer of ferromagnetic ceramic material, having a permitivity that is electrically controllable to modify the behavior of impinging electromagnetic energy, opposite surfaces of said ceramic core having an electrically conductive material thereon, and a differential DC voltage applicator coupled thereto so as to impart a differential voltage to said core layer, said applicator being operative, during transmit/receive mode of an antenna application to set said differential voltage at a first value that renders said laminate structure reflective to RF energy, and during other times, to set said differential voltage at a second value that renders said laminate structure effectively transparent to said RF energy, and during transmit/receive mode of a radome application, being operative to set said differential voltage at a third value that renders said laminate effectively transparent to RF energy, and during other times, to set said differential voltage at a fourth value that is effective to render said laminate effectively absorbent of said RF energy.

2. An RF energy interface according to claim 1, wherein said core layer comprises barium strontium titanate.

3. A radome for an antenna housed therein comprising a multi-laminate structure of plural layers of ferromagnetic ceramic material, each having a permitivity that is electrically controllable to modify the behavior of impinging electromagnetic energy, opposite surfaces of said layers of ceramic material having electrically conductive material thereon, and a differential DC voltage applicator coupled thereto so as to impart differential DC voltages across said layers, said applicator being operative, during transmit/receive mode of said antenna to set said differential voltages at a first value that renders said multi-laminate structure reflective to RF energy, and during other times, to set said differential voltages at a second value that renders said multi-laminate structure effectively transparent to said RF energy.

4. An apparatus for controllably interfacing radio waves incident upon a prescribed spatial region comprising:
   an electrically controlled structure having a first and second opposite surfaces, and containing one or more layers of material therebetween whose transmissivity for said radio waves is electrically alterable by a DC electrical field applied thereacross;
   a first electrode that is effectively transparent to said radio waves and having a first side thereof disposed on a layer of said material at said first surface of said structure, and wherein no layer of said material is disposed on a second side of said first electrode opposite to said first side thereof;
   a second electrode that is effectively transparent to said radio waves having a first side thereof disposed on a layer of said material at said second surface of said structure, and wherein no layer of said material is disposed on a second side of said second electrode opposite to said first side thereof;
   a radio wave transmissivity controller being operative to couple to said first and second electrodes a DC voltage that makes said structure selectively one of transparent, absorptive and reflective to said radio waves incident thereon.

5. An apparatus according to claim 4, wherein said radio wave transmissivity controller is operative to couple to said first and second electrodes a DC voltage that makes said structure transparent to said radio waves incident thereon.

6. An apparatus according to claim 4, wherein said radio wave transmissivity controller is operative to couple to said first and second electrodes a DC voltage that makes said structure absorptive to said radio waves incident thereon.

7. An apparatus according to claim 4, wherein said radio wave transmissivity controller is operative to couple to said first and second electrodes a DC voltage that makes said structure reflective to said radio waves incident thereon.

8. An apparatus according to claim 4, wherein said material comprises barium strontium titanate.

9. A method for controllably interfacing radio waves incident upon a prescribed spatial region comprising the steps of:
   (a) providing an electrically controlled structure having a first and second opposite surfaces, and containing one or more layers of material therebetween whose transmissivity for said radio waves is electrically alterable by a DC electrical field applied thereacross;
      a first electrode that is effectively transparent to said radio waves and having a first side thereof disposed on a layer of said material at said first surface of said structure, and wherein no layer of said material is disposed on a second side of said first electrode opposite to said first side thereof;
      a second electrode that is effectively transparent to said radio waves having a first side thereof disposed on a layer of said material at said second surface of said structure, and wherein no layer of said material is disposed on a second side of said second electrode opposite to said first side thereof; and
   (b) applying a selected DC voltage to said first and second electrodes, by coupling thereto,
      (b1) for a first mode of operation, a first prescribed DC voltage that makes said structure effectively transparent to said radio waves;
      (b2) for a second mode of operation, a second prescribed DC voltage that makes said structure effectively reflective to said radio waves; and
      (b3) for a third mode of operation, a third prescribed DC voltage that makes said structure effectively absoprtive of said radio waves.

10. A method according to claim 9, wherein said material comprises barium strontium titanate.

* * * * *

UNITED STATES PATENT AND TRADEMARK OFFICE
CERTIFICATE OF CORRECTION

PATENT NO.    : 6,300,894 B1                                              Page 1 of 1
DATED         : October 9, 2001
INVENTOR(S)   : Lynch et al.

It is certified that error appears in the above-identified patent and that said Letters Patent is hereby corrected as shown below:

Column 5,
Lines 42, 47, 48, 53 and 54, insert the words -- ferromagnetic ceramic -- between "of" and "material"

Column 6,
Lines 26, 31, 32, 37 and 38, insert the words -- ferromagnetic ceramic -- between "of" and "material"

Signed and Sealed this

Twenty-seventh Day of August, 2002

Attest:

Attesting Officer

JAMES E. ROGAN
*Director of the United States Patent and Trademark Office*